US011944922B1

(12) United States Patent
Smith et al.

(10) Patent No.: US 11,944,922 B1
(45) Date of Patent: Apr. 2, 2024

(54) WATER TREATMENT SYSTEM

(71) Applicant: Randall Smith, Houston, TX (US)

(72) Inventors: Randall Smith, Houston, TX (US); Brian Smith, Houston, TX (US); Michelle Smith Allebach, Friendswood, TX (US)

(73) Assignee: Randall Smith, Houston, TX (US)

( * ) Notice: Subject to any disclaimer, the term of this patent is extended or adjusted under 35 U.S.C. 154(b) by 0 days.

(21) Appl. No.: 18/382,804

(22) Filed: Oct. 23, 2023

Related U.S. Application Data (60) Provisional application No. 63/421,945, filed on Nov. 2, 2022.

(51) Int. Cl.
*B01D 3/02* (2006.01)
*B01D 1/00* (2006.01)
(Continued)

(52) U.S. Cl.
CPC ............. *B01D 3/02* (2013.01); *B01D 1/0035* (2013.01); *B01D 3/007* (2013.01); *B01D 3/42* (2013.01); *C02F 1/048* (2013.01); *C02F 1/14* (2013.01); *C02F 1/16* (2013.01); *F01D 15/10* (2013.01); *F01K 27/02* (2013.01); *F22B 1/1869* (2013.01); *F22B 1/1884* (2013.01); *F22B 27/08* (2013.01);
(Continued)

(58) Field of Classification Search
CPC .................................................. C02F 1/04–18
See application file for complete search history.

(56) References Cited

U.S. PATENT DOCUMENTS 3,215,189 A * 11/1965 Bauer ...................... B01D 1/14
159/46
3,467,587 A * 9/1969 Connell ..................... C02F 1/16
159/905
(Continued)

FOREIGN PATENT DOCUMENTS

ES           2323338 B1 *  4/2010  .............. C02F 1/047

OTHER PUBLICATIONS

Espacenet Translation of ES 2323338.*
(Continued)

*Primary Examiner* — Jonathan Luke Pilcher
(74) *Attorney, Agent, or Firm* — EWING & JONES, PLLC (57) ABSTRACT

The disclosure includes a water system that includes a feed water heat exchanger including a feed water heat exchanger above a water collection tank and a feed water heat exchanger/steam generator connected to the feed water heat exchanger. The feed water heat exchanger/steam generator includes a heat exchanger, coils, boiler burners, and emissions control. The water system includes a brine/waste water feed water heat exchanger positioned within brine/waste water tank enclosure, which includes a brine/waste water tank that is in fluidic connection with the feed water heat exchanger/steam generator. The water system includes a preheater in fluidic connection with the brine/waste water feed water heat exchanger, and a post-preheater heat exchanger enclosure including a post-preheater heat exchanger, post-preheater coils, post-preheater burner and post-preheater emissions control, the post-preheater heat exchanger in fluidic connection with the pre-heater. The water system includes a vapor removal device in fluidic connection with the post-preheater heat exchanger.

23 Claims, 11 Drawing Sheets

(51) Int. Cl.
  B01D 3/00    (2006.01)
  B01D 3/42    (2006.01)
  C02F 1/04    (2023.01)
  C02F 1/14    (2023.01)
  C02F 1/16    (2023.01)
  F01D 15/10   (2006.01)
  F01K 27/02   (2006.01)
  F22B 1/18    (2006.01)
  F22B 27/08   (2006.01)
  F22D 1/02    (2006.01)
  H02K 7/18    (2006.01)
  C02F 103/08  (2006.01)

(52) U.S. Cl.
  CPC ............. *F22D 1/02* (2013.01); *H02K 7/1823* (2013.01); *C02F 2103/08* (2013.01); *C02F 2201/009* (2013.01); *C02F 2209/02* (2013.01); *C02F 2209/40* (2013.01); *F05D 2220/76* (2013.01)

(56) References Cited

U.S. PATENT DOCUMENTS

| | | | | |
|---|---|---|---|---|
| 3,476,653 A * | 11/1969 | Doland | ................... | F01K 17/04 203/DIG. 20 |
| 5,405,503 A * | 4/1995 | Simpson | ................. | F01K 17/04 210/687 |
| 5,622,605 A * | 4/1997 | Simpson | ................. | F01K 17/04 203/40 |
| 5,925,223 A * | 7/1999 | Simpson | .............. | B01D 5/0081 202/160 |

OTHER PUBLICATIONS

Veolia "Handbook of Industrial Water Treatment", (311 pages) Website visited May 2022 https://www.watertechnologies.com/handbook/handbook-industrial-water-treatment.
World Health Organization "Safe Drinking-water from Desalination" 2011, (32 pages) https://iris.who.int/bitstream/handle/10665/70621/WHO_HSE_WSH_11.03_eng.pdf.
Wikipedia "Multiple-effect distillation" (3 pages) Website visited May 2022 https://en.wikipedia.org/wiki/Multiple-effect_distillation.
Wikipedia "Multiple-stage flash distillation" (4 pages) Website visited May 2022 https://en.wikipedia.org/wiki/Multi-stage_flash_distillation.
Wikipedia "Reverse osmosis" (15 pages) Website visited May 2022 https://en.wikipedia.org/wiki/Reverse_osmosis.
Green Garage "12 Biggest Pros and Cons of Desalination", Feb. 3, 2016 (7 pages) https://greengarageblog.org/12-biggest-pros-and-cons-of-desalination.
Quora "Does a reverse osmosis water filter remove chlorine from water?", K Depaul "Reverse Osmosis Water Contaminant Rejection Table" (9 pages) Website visited May 2022 https://www.quora.com/Does-a-reverse-osmosis-water-filter-remove-chlorine-from-water.
State Water Resources Control Board "Groundwater Information Sheet 1,4 Dioxane", Nov. 2019 (6 pages) https://www.waterboards.ca.gov/gama/docs/coc_1_4_dioxane.pdf.
Britannica Seawater—Early Oceans, Salinity, Chemistry "Density of seawater and pressure" (30 pages) Website visited May 2022 https://www.britannica.com/science/seawater/Dissolved-inorganic-substances.
Wikipedia "Seawater" (12 Pages) Website visited May 2022 https://en.wikipedia.org/wiki/Seawater.
Corrosionpedia "What Does Demineralization Mean?" (6 pages) Website visited May 2022 https://www.corrosionpedia.com/definition/368/demineralization.
B. I. Dvorak, S. O. Skipton "Drinking Water Treatment: Distillation" Dec. 2013 (5 pages) Website visited May 2022 https://extensionpublications.unl.edu/assets/html/g1493/build/g1493.htm#:~:text=Contaminants%20Removed%20from%20Water%20by%20Distillation,-Distillation%20can%20remove&text=Distillation%20also%20can%20remove%20many,chlorine%2C%20chloramines%2C%20and%20radionucleides.
The Engineering Toolbox "Liquids and Gases—Boiling Points" (14 pages) Website visited May 2022 https://www.engineeringtoolbox.com/boiling-points-fluids-gases-d_155.html#gsc.tab=0.
PurePro "PurePro Drinking Water System" (3 pages) Website visited May 2022 https://www.pure-pro.com/purepro_membrane.htm#:~:text=The%20pore%20size%20of%20RO,will%20not%20let%20it%20through.
Wikipedia "Reclaimed water" (22 pages) Website visited May 2022 https://en.wikipedia.org/wiki/Reclaimed_water.
M. Simon, Wired "Desalination is Booming. But What About All That Toxic Brine?", Jan. 14, 2019 (16 pages) https://www.wired.com/story/desalination-is-booming-but-what-about-all-that-toxic-brine/.
The Salt Association "Chemistry of Salt" (8 pages) Website visited May 2022 https://saltassociation.co.uk/education/chemistry-salt/.
The Salt Association "About Chlorine" (15 pages) Website visited May 2022 https://saltassociation.co.uk/education/chemistry-salt/chlorine-cl2/.
The Salt Association "About Sodium Hydroxide" (8 pages) Website visited May 2022 https://saltassociation.co.uk/education/chemistry-salt/sodium-hydroxide-naoh/.
Persistence Market Research "Sea Salt Market" (5 pages) Website visited May 2022 https://www.persistencemarketresearch.com/market-research/sea-salt-market.asp.
N. Beilstein "Companies Join to Create First Mass Manufacturing of Sodium-ion Batteries" May 16, 2022 (5 pages) https://www.thomasnet.com/insights/companies-join-to-create-first-mass-manufacturing-of-sodium-ion-batteries/.
Wikipedia "Desalination" (32 pages) Website visited May 2022 https://en.wikipedia.org/wiki/Desalination#Cogeneration.
Wikipedia "Biogas" (24 pages) Website visited May 2022 https://en.wikipedia.org/wiki/Biogas.
NASA Technology Transfer Program "Power Generation And Storage, Solar Powered Carbon Dioxide CO2 Conversion (TOP2-160), A low-cost nanomaterial thin-film device" (3 pages) Website visited May 2022 https://technology.nasa.gov/patent/TOP2-160.
A. Warner, College of Science, Engineering, and Technology "Selection of materials for Use in Desalination Plants: A Corrosion Literature Review Paper" (8 pages) Website visited May 2022 https://www.svsu.edu/media/writingprogram/Selection%20of%20Materials%20for%20Use%20in%20Desalination%20Plants%20-%20A%20Corrosion%20Literature%20Review%20Paper.pdf.
Stainless Structurals "The Effects of Salt Water on Stainless Steel" Jul. 25, 2018 (3 pages) https://www.stainless-structurals.com/blog/stainless-product/the-effects-of-salt-water-on-stainless-steel/.

* cited by examiner

WATER TREATMENT SYSTEM

CROSS-REFERENCE TO RELATED APPLICATIONS

This application is a nonprovisional application which claims priority from U.S. provisional application No. 63/421,945, filed Nov. 2, 2022, which is incorporated by reference herein in its entirety.

TECHNICAL FIELD/FIELD OF THE DISCLOSURE

The present disclosure relates generally to a distillation and electrical generation process for producing distilled water and electricity from feed water.

BACKGROUND OF THE DISCLOSURE

Various methods have been traditionally used to make distilled water. For example, Multiple-effect Distillation (MED) may be used for sea water desalination. MED traditionally includes multiple stages or "effects". In each stage the feed water is heated by steam pipes, usually by spraying saline water onto the steam pipes. Some of the water evaporates, and this evaporate flows into the pipes of the next stage (effect), heating and evaporating more water. Each stage reuses the energy from the previous stage, with successively lower temperatures and pressures after each stage. MED has a number of disadvantages. For example, with each successive stage (effect), the temperature difference between the seawater and the pipes gets smaller, which reduces the heat transport per unit surface of the pipes. Reducing heat transport slows down the rate of evaporation in subsequent stages unless the surface area is increased. In addition, temperatures as low as 50° C. may be used and might not achieve the required pathogen inactivation targets. Further, MED has high operating costs when waste heat is not available. MED is incompatible with higher temperature heat sources due to scaling issues during spray evaporation. MED may require a vacuum system to control pressure in the effects. In addition, MED is difficult to scale down due to complexity and large numbers of parts required. Further, MED does not normally generate electricity Another method for desalination is Multi-Effect Distillation Adsorption Desalination (MEDAD). MEDAD integrates Multiple-effect Distillation (MED) with an adsorption desalination (AD) cycle. With MED, the number of effects is limited by the first and last temperatures in the sequence. The input temperature normally cannot be more than 70° C. to avoid scaling on the pipes. The output temperature may be at least the ambient (air) temperature so that the steam will condense. The ambient air temperature can often exceed 40° C. in arid regions. MEDAD breaks the output temperature lower limit and allows the output temperature to be lowered to 7° C. This allows MEDAD to include additional stages (effects) or allows each stage to operate at a larger temperature difference MEDAD includes a silica gel that absorbs water vapor as cool as 7° C. The gel has special properties that allow it to be both hydrophilic and hydrophobic, depending on the temperature. At cool temperatures, the gel absorbs the water. But when heated up, the gel releases the water at temperatures above the ambient air temperature so that it can condense in the final stage. The gel only needs to be heated to a temperature between 55 and 80° C., which reduces energy requirements. However, MEDAD suffers a number of disadvantages. With each successive stage (effect), the temperature difference between the seawater and the pipes gets smaller which reduces the heat transport per unit surface of the pipes. However, with the addition of the adsorption desalination component, this becomes less of an issue. Temperatures as low as 50° C. may be utilized and might not achieve the required pathogen inactivation targets. MEDAD is incompatible with higher temperature heat sources due to scaling issues during spray evaporation. MEDAD may require a vacuum system to control pressure in the effects. MEDAD may be difficult to scale down due to complexity and large numbers of parts required. MEDAD does not normally generate electricity Solar distillation may be used to generate distilled water. In solar distillation, an enclosed water source is heated by the sun, causing some of the water to evaporate. Solar distillation captures the evaporated water as the evaporated water condenses on the inside of the enclosure. Disadvantages of solar distillation include that the rate of water production for a single unit tends to be low and is proportional to the amount of land available for the process. Solar distillation does not work at night or on cloudy days. Solar distillation plants do not generate electricity.

Another method of generating clean water is through the Reverse Osmosis (RO) process. RO uses pressure to push feed water through one or more semi-permeable membranes allowing water to pass but rejecting dissolved species and other particulates. Normally, water spontaneously diffuses through a semi-permeable membrane from a dilute solution to a concentrated solution. However, the reverse process is realized by applying enough external pressure on the concentrated side to overcome the osmotic pressure on the feed water. This allows water molecules on the concentrated side to move to the dilute side. RO processes suffer from a number of disadvantages. RO consumes a large amount of energy, including the energy required to provide reverse osmosis pressure. For cases where RO systems are designed to generate a very high quality of water, a double pass RO design may be used, where the permeate of the first membranes becomes the feed for a successive RO stage. Such designs require high pressures and have reduced flow rates making these RO designs energy sinks. In addition, Seawater RO systems may have a low clean water to brine ratio compared to other desalination technologies because of the need to flush the water containing high concentrations of dissolved substances at the feed side. RO processes do not generally remove boron or boric acid. Frequent maintenance may be needed to keep RO membranes clean. Impurities build up on the membrane surface during operations. Periodic use of RO treatment chemicals may be needed to keep contaminants from attaching to the membrane surface. Membranes may need to be properly flushed after chemical treatments and the flushing solution should be disposed of suitably as waste. In addition, bacteria may traverse through membrane defects, meaning membranes cannot be considered as completely effective for disinfection and are commonly succeeded by a disinfection step. Pretreatment of the source water after the intake is normally designed to remove contaminants that will interfere with the desalination process by, for example, scale formation, clogging, or membrane fouling. Further, several pretreatment steps may be required in a typical seawater reverse osmosis plant, including: pre-chlorination dosing, media filter, activated carbon filter, ultrafiltration, and antiscalant dosing. These all add to the cost and complexity of a RO system. Seawater RO is most effective if multiple membranes are used in a multi-stage process, adding to the number of components in the process. N-Nitrosodimethylamine is known to be poorly removed by RO membranes because of its low molecular weight, and it is often treated by advanced oxidation processes in water reuse schemes. Further, most RO membranes are irreparably damaged by chlorine. A carbon filter pretreatment may be needed before the RO membrane to reduce chlorine. RO processes may allow viruses to pass through the membranes. For these cases, post processing is required to ensure that the water quality meets industry standards. RO plants are expensive to build, making them unfeasible for some countries and communities. In addition, electricity is typically not generated in a RO plant.

Municipal waste treatment plants may treat water. However, salt in seawater cannot be effectively removed by the current waste water treatment process because the salt is dissolved in the water. And municipal water treatment plants do not normally generate electricity.

A method and device for the production of purified steam is shown in U.S. Pat. No. 7,611,604. As described, pure steam is generated by pumping a purified feedwater through a shell and tube evaporator, which when heated by plant steam, evaporates and migrates to a centrifugal separator. The centrifugal separator, which contains a controlled level of condensed, concentrated water, forces all remaining moisture from the steam, producing a dry, highly purified stream of pure steam. The process is primarily designed for pharmaceutical manufacturing applications. Disadvantages include that the method requires purified feedwater as input and does not normally generate electricity.

Another traditional process is demineralization. Demineralization is an ion exchange process that is carried out with the help of organic substances called ion-exchange resins. Ion-exchange resins are insoluble, crosslinked organic polymers with a microporous structure and the functional groups are attached to chains which are responsible for exchange ions. Disadvantages of the demineralization process include that demineralization does not remove viruses or bacteria, the equipment is costly, and expensive chemicals are needed. In addition, if the water contains turbidity, then the output of the process is reduced. Also, the exchangers may need to be periodically regenerated with acid and alkali solutions, and the demineralization process does not normally generate electricity.

SUMMARY

The disclosure includes a water system. The water system includes a feed water heat exchanger, the feed water heat exchanger including a feed water heat exchanger above a water collection tank and a feed water heat exchanger/steam generator in fluidic connection with the feed water heat exchanger, wherein the feed water heat exchanger/steam generator includes a heat exchanger, coils, boiler burners and emissions control. The water system also includes a brine/waste water feed water heat exchanger positioned within a brine/waste water tank enclosure, the brine/waste water tank enclosure further including a brine/waste water tank, the brine/waste water feed water heat exchanger in fluidic connection with the feed water heat exchanger/steam generator. In addition, the water system includes a preheater, the preheater in fluidic connection with the brine/waste water feed water heat exchanger, and a post-preheater heat exchanger enclosure including a post-preheater heat exchanger, post-preheater coils, post-preheater burner and post-preheater emissions control, the post-preheater heat exchanger in fluidic connection with the pre-heater. The water system includes a vapor removal device, the vapor removal device in fluidic connection with the post-preheater heat exchanger.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In certain embodiments of the present disclosure, the feed water can be seawater, treated effluent from a waste water treatment plant or industrial process, or untreated fresh water from natural sources. As distillation of water often requires significant amounts of energy and as there is currently an emphasis on reducing dependence on fossil fuels, one fuel to generate heat for the current process is biofuel and other forms of renewable energy. In some embodiments of the present disclosure, there is a focus on making efficient use of the heat which is generated in the process.

In some embodiments, water distillation separates pure water from particulate and organic matter. Some contaminants may cause fouling and/or pitting of components if not removed. To address this issue, in certain embodiments, a method for flushing contaminants from the system components is used.

In certain embodiments, a computer control system is integrated into the entire process to control valves, pumps, and burners. These components may be used to control feed water path and flow rate, as well as heat levels.

Advantages of some of the embodiments in the present disclosure include that the result of the distillation process is a clean distillate. The method may remove bacteria, organic and inorganic particles, viruses, minerals, salts, and metals from the water. In addition, a significant percentage of heat is recycled and some embodiments use waste heat. Certain embodiments of the present disclosure use solar energy. Further, the temperature difference between the steam/brine/waste water and feed water pipes is larger than the temperature differences in many other types of distillation processes. This increases the heat transport per unit surface of the pipes, which speeds up evaporation. The amount of water distilled is directly proportional to the amount of energy transport. Some embodiments of the present disclosure may not use equipment to reduce pressure. Generally, less equipment reduces overall cost and complexity. In some embodiments of the present disclosure, condensers are not used. Generally, less equipment reduces overall cost and complexity. Further, boiler temperatures may be lower than industrial steam boilers, reducing safety concerns. Computer control of heat and feed water flow rate along with a vapor removal device such as a deaerator, may provide a precise method of removing low boiling point contaminants. In addition, computer control of heat and feed water flow rate, such as through feed water pump 130 (described below) may provide a precise method of preventing non-water particles from evaporating. In certain embodiments, there is flexibility in the types of heat that can be used. Further, the present disclosure has flexibility in the types of source feed water that can be used and the process generates electricity.

In some embodiments, fouling of process components may be an issue. Such fouling may be addressed by using corrosion resistant materials such as aluminum, bronze, or stainless-steel alloys or specialized alloys such as Monel or Inconel. In other embodiments, fouling may be addressed by using low-fouling surface coatings on some process components, a high feed water velocity via the process pumps, periodic pressure pulses via the process pumps, adjustment of the feed water pH, and/or chemical scavenging of the feed water.

Figure 1A:
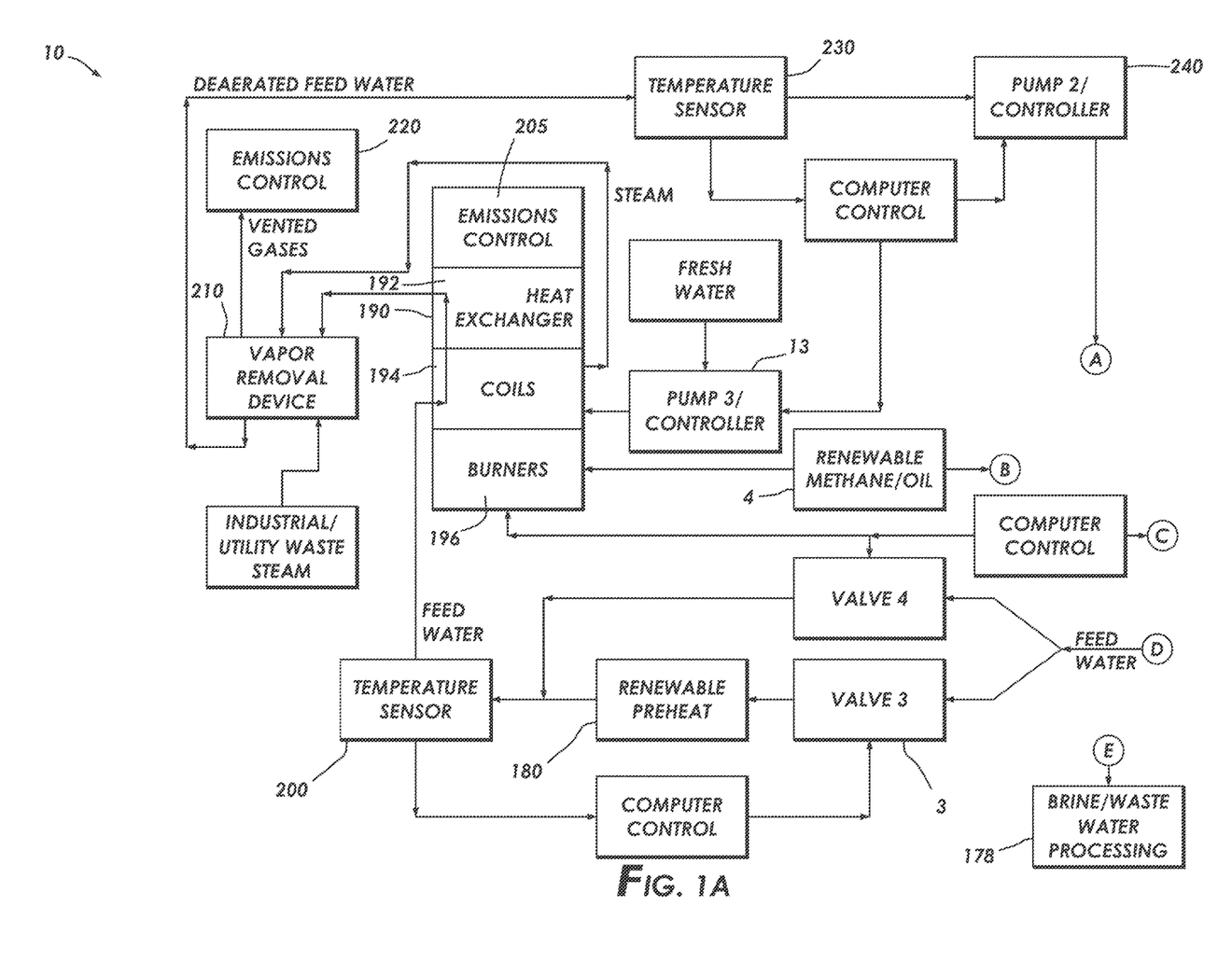
FIGS. 1A-1C are a schematic of a water distillation/power generation process consistent with certain embodiments of the present disclosure.
Figure 1B:
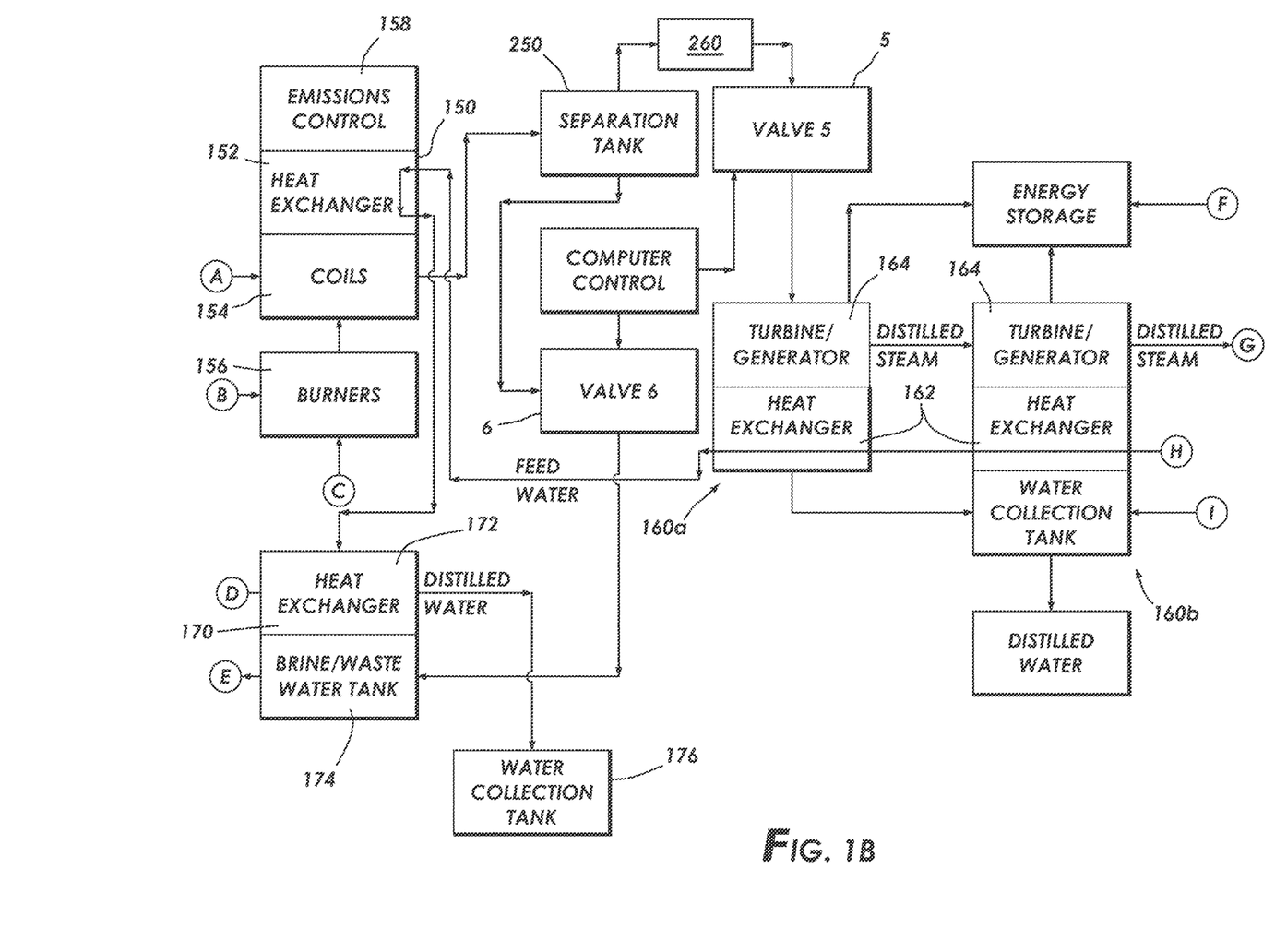
Figure 1C:
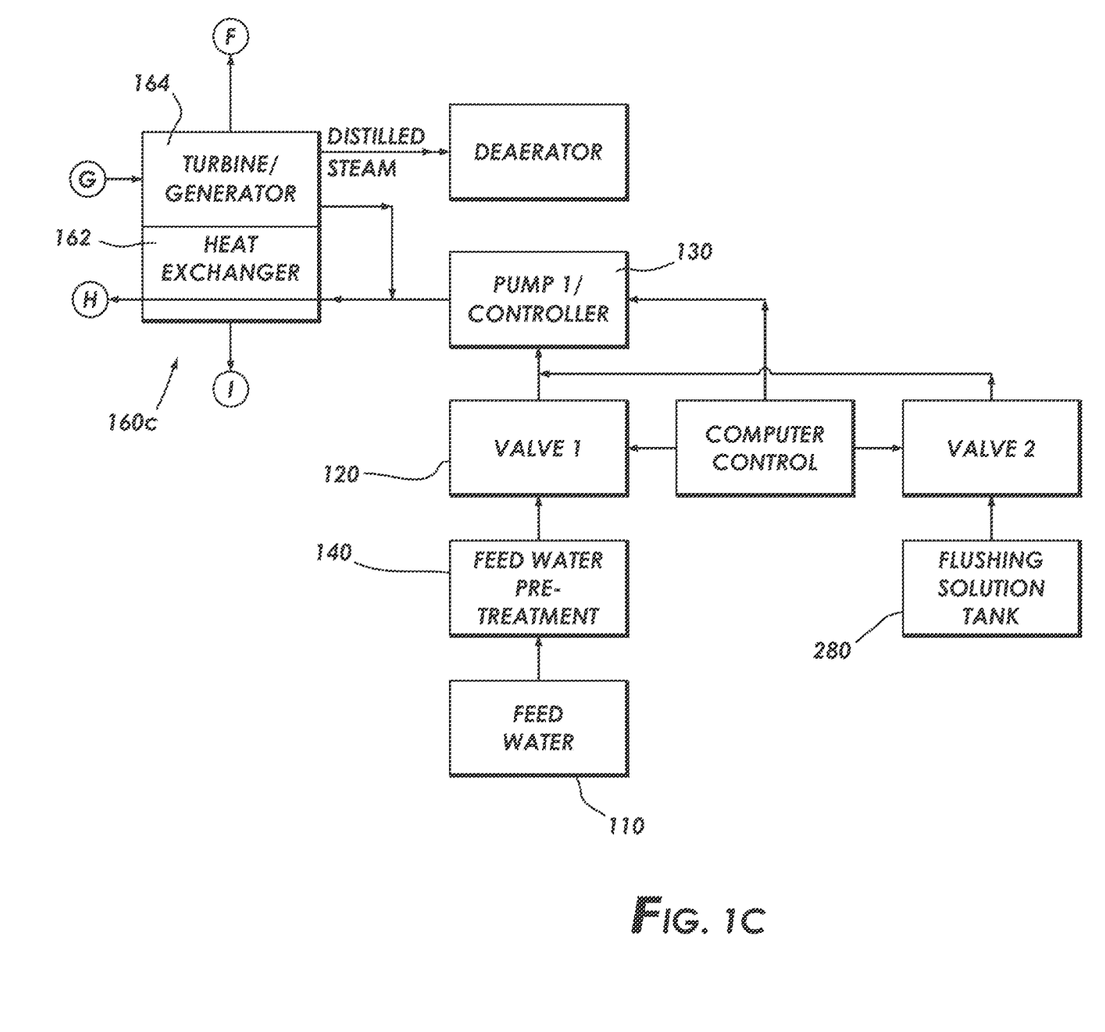

FIGS. 1A, 1B, and 1C depict water distillation process 10. In water distillation process 10, feed water 110 from feed water source 110 is fed through feed water valve 120 to feed water pump 130. In certain embodiments, feed water pump 130 may be a variable speed pump. In some embodiments, prior to feeding feed water 110 to feed water pump 130, feed water 110 may be fed to feed water pre-treatment 140, such as by lime softening, coagulation and filtration, ozonation, or UV light. Feed water pre-treatment 140 may be included to remove or disinfect particulate and/or organic matter that may not be removed, killed, or inactivated by other steps in water distillation process 10.

Figure 2:
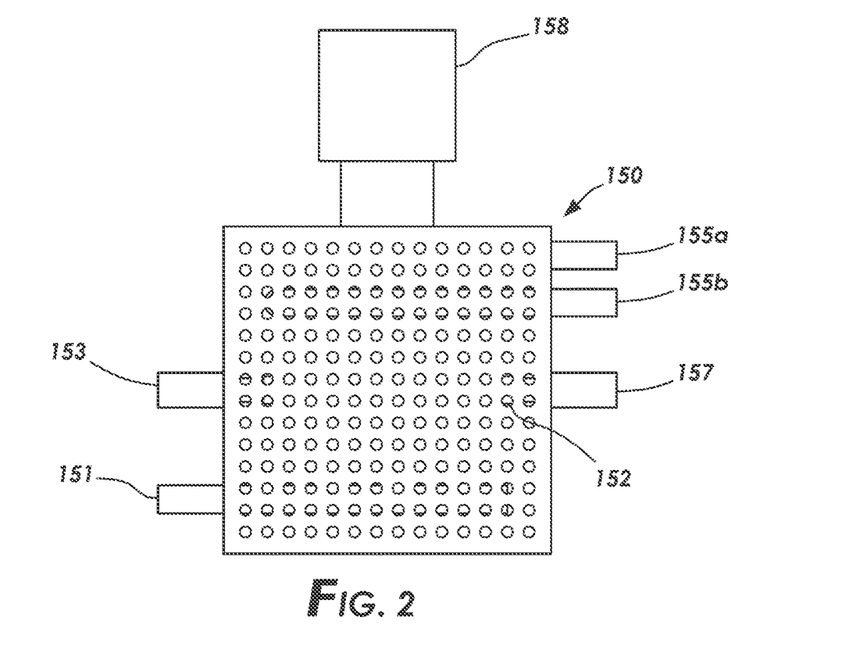
FIG. 2 is a side view of the feed water heat exchanger/steam generator consistent with certain embodiments of the present disclosure.
Figure 3:
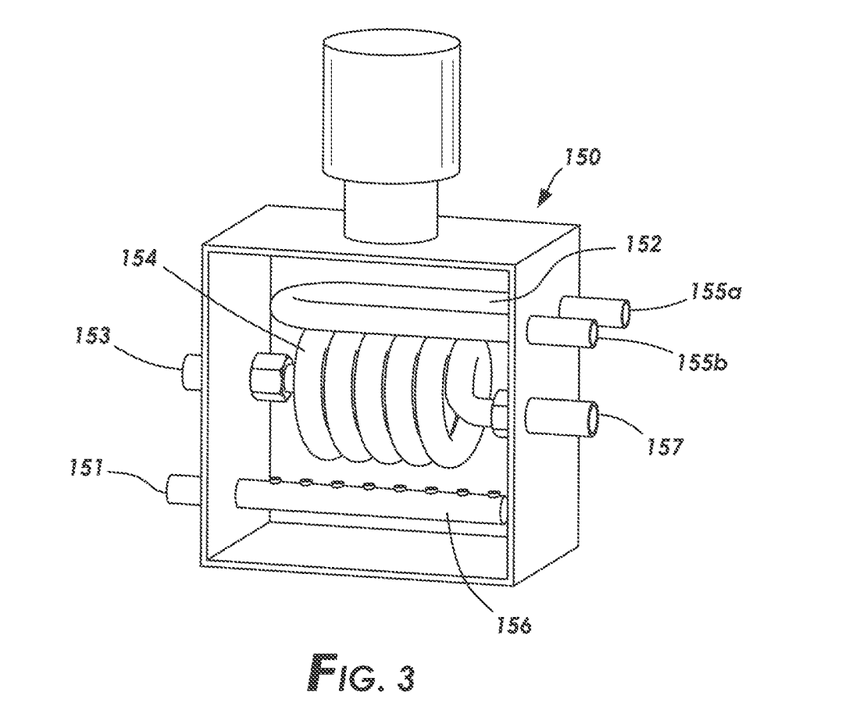
FIG. 3 is a cutaway view of the feed water heat exchanger/steam generator consistent with certain embodiments of the present disclosure.

From feed water pump 130, feed water is sent to be heated in feed water heat exchangers 162 of steam turbine enclosures 160a, b, c. Initially, such as upon startup, no exchange of heat occurs in steam turbine enclosures 160a, b, c between feed water 110 and steam because steam has not yet been produced for feed to steam turbine enclosures. Once steam is formed for use in steam turbine enclosures 160a, b, c, some of the steam condenses on feed water heat exchangers 162, heating the feed water while condensed steam falls into water collection tank 166 as distilled water. Upon exiting the feed water heat exchangers 162 in steam turbine enclosures 160a, b, c, feed water then enters feed water heat exchanger/steam generator 150. In certain embodiments, feed water heat exchanger/steam generator 150 includes heat exchanger 152, boiler coils 154 positioned below heat exchanger 152, boiler burners 156 positioned below boiler coils 154, and emissions control 158, as shown in FIGS. 2 and 3. As shown in FIG. 2, feed water heat exchanger/steam generator 150 includes gas inlet port 151, deaerated feed water inlet port 153, feed water inlet/outlet ports 155a, 155b, and steam/brine/waste water outlet port 157. In addition, carbon dioxide, and NOx may be expelled through emissions control 158. Feed water may be heated in heat exchanger 152 by boiler burners 156 and boiler coils 154 as shown in FIG. 3. Boiler burners 156 may be supplied with gas for heating, such as, for example, natural gas or waste gases. Boiler coils 154 may also supply heat to deaerated feed water during operation.

Figure 11:
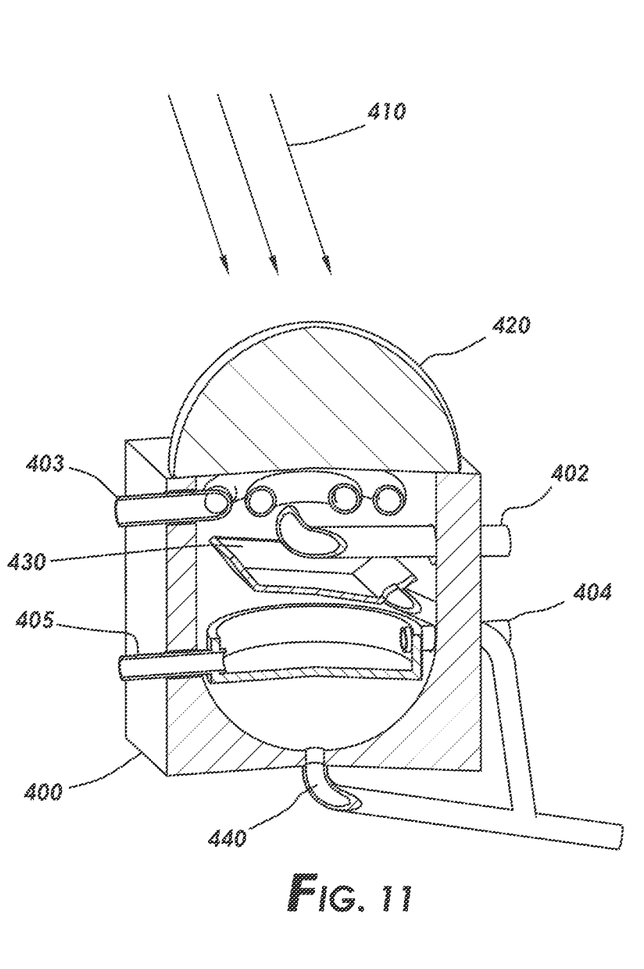
FIG. 11 is a cutaway view of a solar brine/waste water tank consistent with certain embodiments of the present disclosure.

Following heating in feed water heat exchanger 152, heated feed water 110 is sent to brine/waste water feed water heat exchanger 172 positioned within brine/waste water tank enclosure 170. As with feed water heat exchangers 162 in steam turbine enclosures 160a, b, c, no exchange of heat occurs initially in brine/waste water tank enclosure 170 as heated brine or waste water is not yet present in the brine/waste water basin as shown in FIG. 11. Once brine/waste water basin contains brine or waste water, some of the water vapor from the brine or waste water condenses and heats feed water 110 inside while the condensed steam falls down into water collection tank 176 as distilled water. In certain embodiments, brine/waste water basin may feed brine/waste water processing tank 178

In certain embodiments, upon exiting brine/waste water feed water heat exchanger 172, preheat valve 3 is opened to allow the feed water to pass through preheater 180. Preheater 180 may be any component that generates heat and that can be used to heat feed water 110. Non-limiting examples include a solar preheater, waste heat, heat pump, and electrical heater.

Solar preheater: A solar preheater may include parabolic troughs, solar vacuum tubes, parabolic reflectors, Fresnel lenses or any other solar device that generates heat. Preheat valve 3 may not be opened if the solar radiation intensity is not above a predetermined threshold.

Waste heat: Waste heat may include waste heat from a power or industrial plant, gas turbine, or any process that generates waste heat. Preheat valve 3 is not opened if waste heat is not present.

Heat Pump: Heat pumps may transfer heat from the ambient air to heat up feed water pipes.

Electrical heater: The electrical heater may include any device that is electrically powered and that generates heat, such as an induction heater or laser.

In other embodiments, such as when a preheater is not present, preheat valve 3 is not opened and preheat bypass valve 4 is opened instead, allowing feed water 110 to proceed to post-preheater heat exchanger 192. In some embodiments, fresh water may be supplied to a separate set of post-preheater coils 194 through pump 13.

Figure 12:
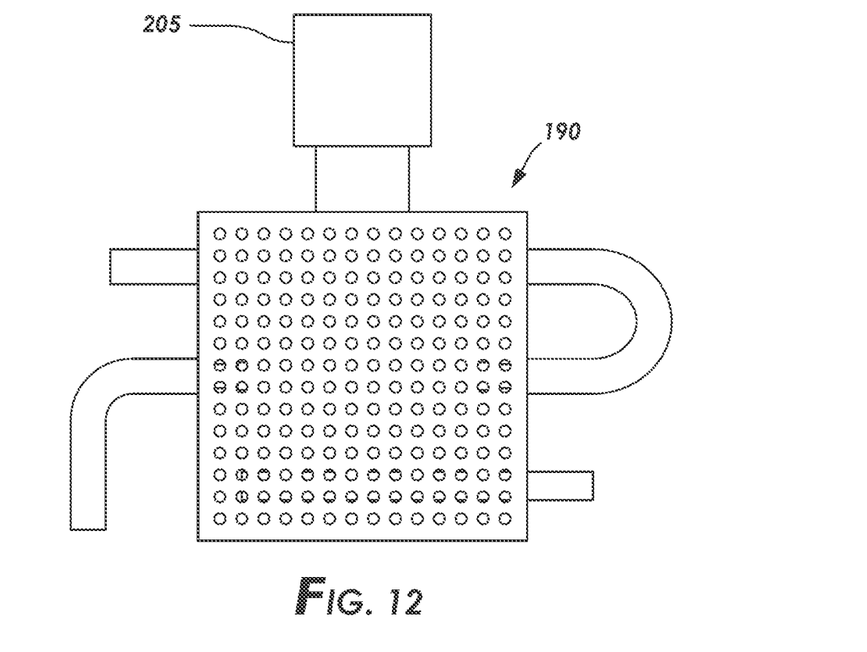
FIG. 12 is a side view of a post-preheater heat exchanger enclosure consistent with certain embodiments of the present disclosure.
Figure 13:
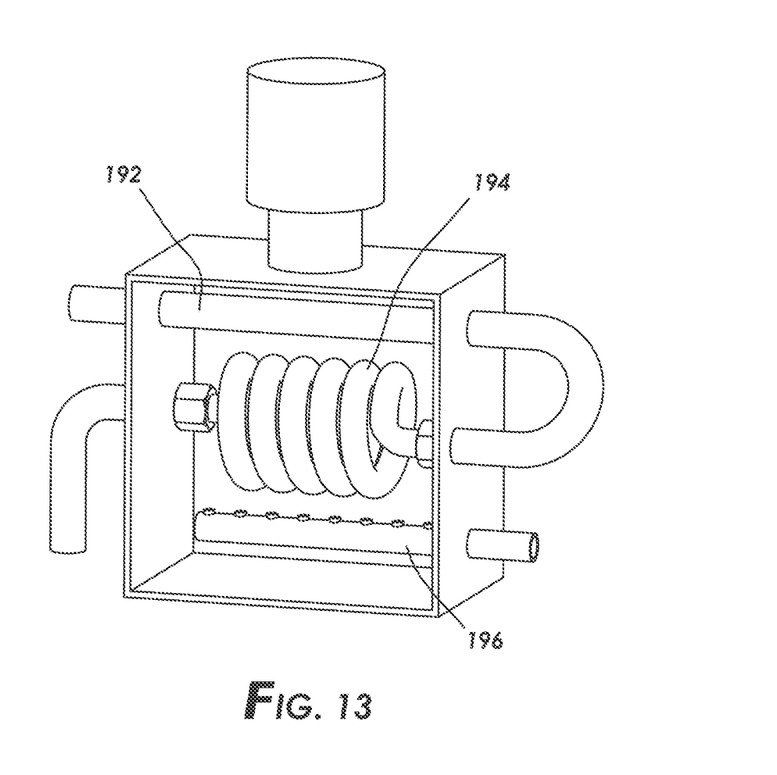
FIG. 13 is a cutaway/transparent view of a post-preheater heat exchanger enclosure consistent with certain embodiments of the present disclosure.

Post-preheater heat exchanger enclosure 190 is outfitted in much the same way as feed water heat exchanger/steam generator 150, which includes post-preheater heat exchanger 192, post-preheater coils 194, post-preheater burners 196, and post-preheater emissions control 205, as shown in FIGS. 12 and 13. The amount of heat exchanged in post-preheater heat exchanger 192 may depend on the feed temperature as determined by temperature sensor 200. Water temperature data may be used to operate post-preheater burners 196 to achieve the proper deaeration feed temperature. Vapor removal device 210 vents gases inside feed water 110 that have boiling points lower than that of the boiling point of water. Non-limiting examples of vapor removal device 210 may include air separators, air eliminators, and deaerators. When the vapor removal device 210 is a deaerator, pressure deaeration (with steam as the purge gas) may be used for removing low boiling point gases. Pressure deaeration includes mixing steam with the incoming feed water 110. Incoming feed water may be within a few degrees of the temperature of the steam at saturation temperature. To achieve the desired deaeration feed temperature, feed water 110 is heated by post-preheater burners 196. Multiple burners may be computer controlled, allowing control of the number of burners that are operating as well as the amount of heat from each burner. Feed water 110 flow rate can be adjusted as desired. After passing through coils, feed water 110 flows through the heat exchanger, further raising the temperature of feed water 110, and then enters vapor removal device 210.

In certain embodiments, post-preheater burners 196 heat post-preheater coils 194 through which feed water 110 flows. Post-preheater coils 194 increase the surface contact area between feed water 110 and post-preheater coils 194 in a compact space, which increases overall thermal and space efficiency. A coil design also provides better mixing of steam, water, particulate matter, and organic matter which reduces the likelihood of corrosion. Additionally, the inside of post-preheater coils 194 may be ribbed and spray nozzles may be added, further increasing the surface contact area. The comments in also apply to boiler coils 154.

In certain embodiments, fuel for burners 156 and 196 is biofuel. Biofuels include, but are not limited to, methane from animal waste or landfills.

In at least one embodiment, steam for input to vapor removal device 210 may be generated from waste steam from an industrial or utility process. If such a waste stream is not available, waste steam output from one or more of the steam turbine enclosures 160a, b, c may be used. Alternately, steam may be created by transporting water from a fresh water source by pump 13 to a separate set of post-preheater coils in 194. Finally, the steam for input to the deaerator may come from any combination of these three sources. FIGS. 1A, 12 and 13 illustrate the first two of these three options.

In some embodiments, burning biofuel or fossil fuel releases emissions, mainly $CO_2$ and NOx. To address generation of $CO_2$ and Nox, emissions control 205 and 158 may be used. An emissions control may include one or more scrubbers and/or a Selective Catalytic Reduction component. In some embodiments, a light source may be used to convert $CO_2$ to methane for reuse by the biogas burners as described in U.S. Pat. No. 9,528,192, which is incorporated herein by reference. As one of ordinary skill in the art with the benefit of this disclosure will understand, other forms of emissions control devices may be used.

Deaeration in vapor removal device 210 may also release emissions in the form of vented gases. In some embodiments, to control the vented gases, emissions control device 220 may include a filter, wet or dry scrubber, or a gas cleaning/neutralizing process.

Once feed water 110 has been deaerated, the temperature of feed water 110 is measured by temperature sensor 230. Based on the temperature of feed water 110 as measured by temperature sensor 230, the amount of heat for boiler burners 156 and the feed water 110 flow rate to vaporize only water in boiler coils 154 may be determined. If too much heat is applied and/or if the flow rate is too low, some particulate and/or organic matter in feed water 110 may also be vaporized, which may be undesirable. Conversely, if not enough heat is applied and/or the flow rate is too high, steam production may not be optimal. Feed water 110 flow rate may be adjusted through variable speed pump 240.

Figure 4:
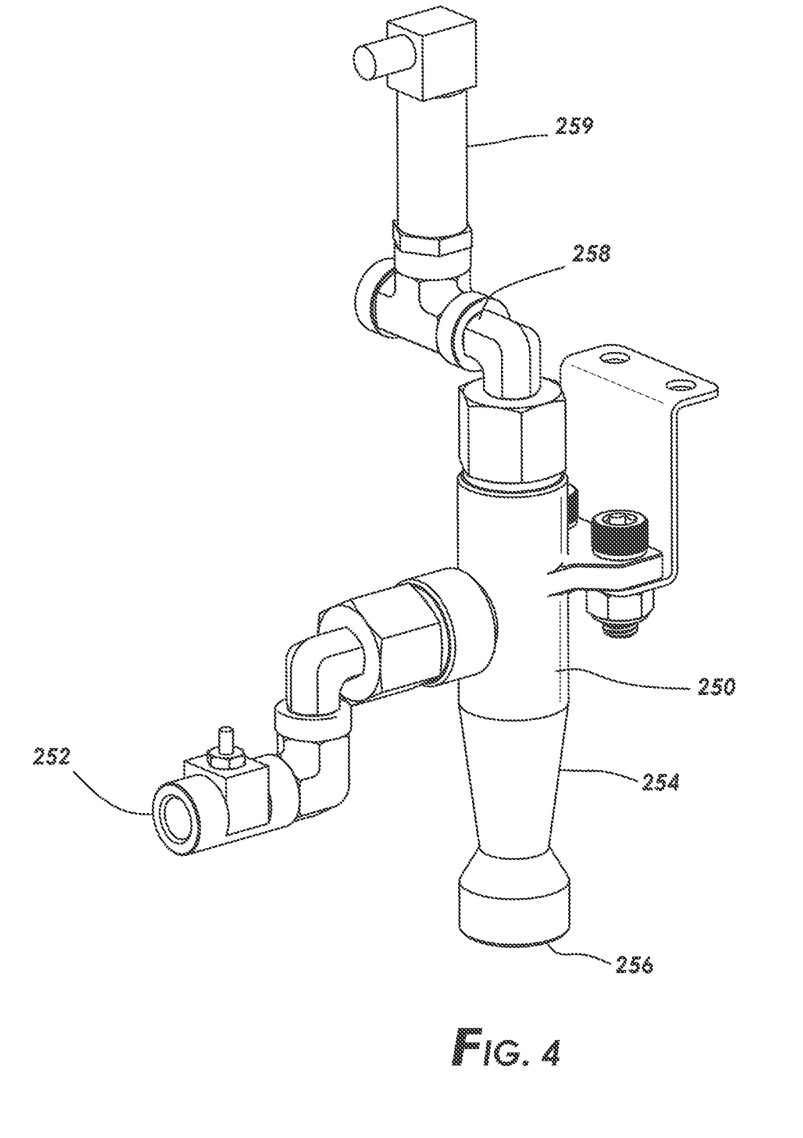
FIG. 4 is a side view of a separation tank consistent with certain embodiments of the present disclosure.

As shown in FIGS. 1 and 4, water and steam from boiler coils 154 may be separated in separation tank 250. Water and steam from boiler coils 154 may include particulates, sand, and organic matter. Separation of the water vapor from the liquid water, solid and liquid particulate and organic matter takes place in separation tank 250, which is connected to boiler coils 154. One example of a separation tank is shown in FIG. 4. The mixture of water, steam, particulates, sand, and organic matter from boiler coils 154 flows into separation tank 250 from separation tank inlet 252 where the heavier solid and liquid particulate and organic matter falls to bottom 254 of separation tank 250 by gravity. Valve 6 may be opened to allow the solids and liquids to flow from separation tank outlet 256 to brine/waste water tank 174 where the solids and liquids may be removed for processing via tank truck, pipeline, or some other means. If the feed water is seawater, minerals and gases, such as sodium, road or table salt, chlorine, sodium hypochlorite, sodium hydroxide, hydrogen, magnesium, calcium, and potassium can be extracted from the brine for commercial purposes. Other types of feed water may offer similar opportunities. In addition, brine can be an input into a Pressure Retarded Osmosis (PRO) process to generate non-polluting electricity. PRO has the added benefit of diluting brine, making it less saline if it is to be returned to the ocean.

Water vapor may exit separation tank 250 at the top of separation tank 250 as steam through steam outlet 258. Pressure relief valve 259 on separation tank 250 may ensure that separation tank 250 pressure will not exceed the pressure limits of the tank. The steam flows through valve 5 into one of steam turbine enclosures 160a, b, c where it turns turbine/generator 164 to generate electricity. The electricity can charge up a battery or some other energy storage device or medium such as nano-electro fuel as described in US patent application publication US20160126581A1, for example and without limitation. In addition, some of the steam condenses on the feed water heat exchanger 162 within steam turbine enclosure 160a, b, c and falls into water collection tank 166 as distilled water.

In some embodiments, superheater 260, such as that shown in FIG. 2, may be added following separation tank 250 to super heat the steam and provide more force to turbine/generators 164.

Figure 5:
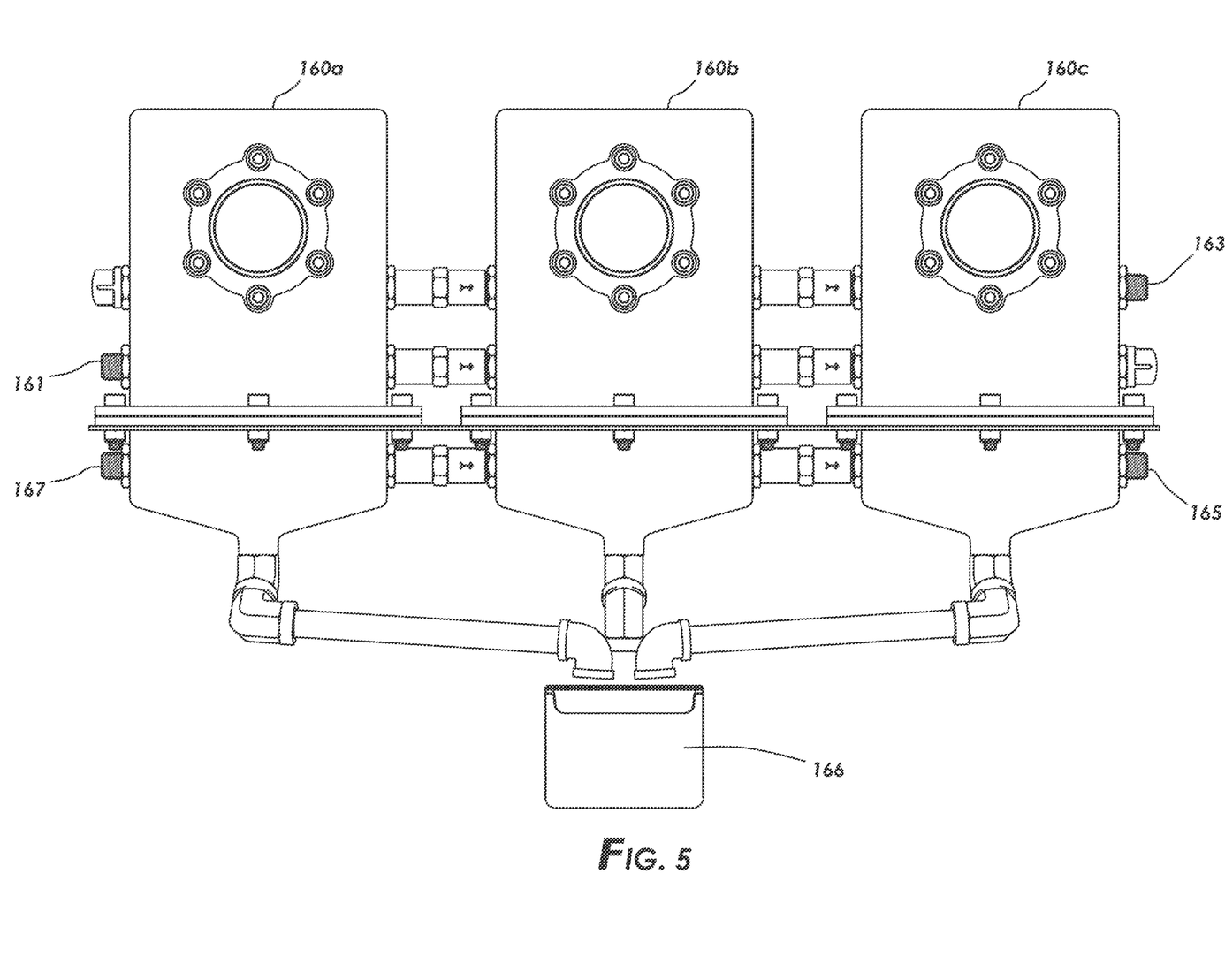
FIG. 5 is a front view of steam turbine enclosures consistent with certain embodiments of the present disclosure.
Figure 6:
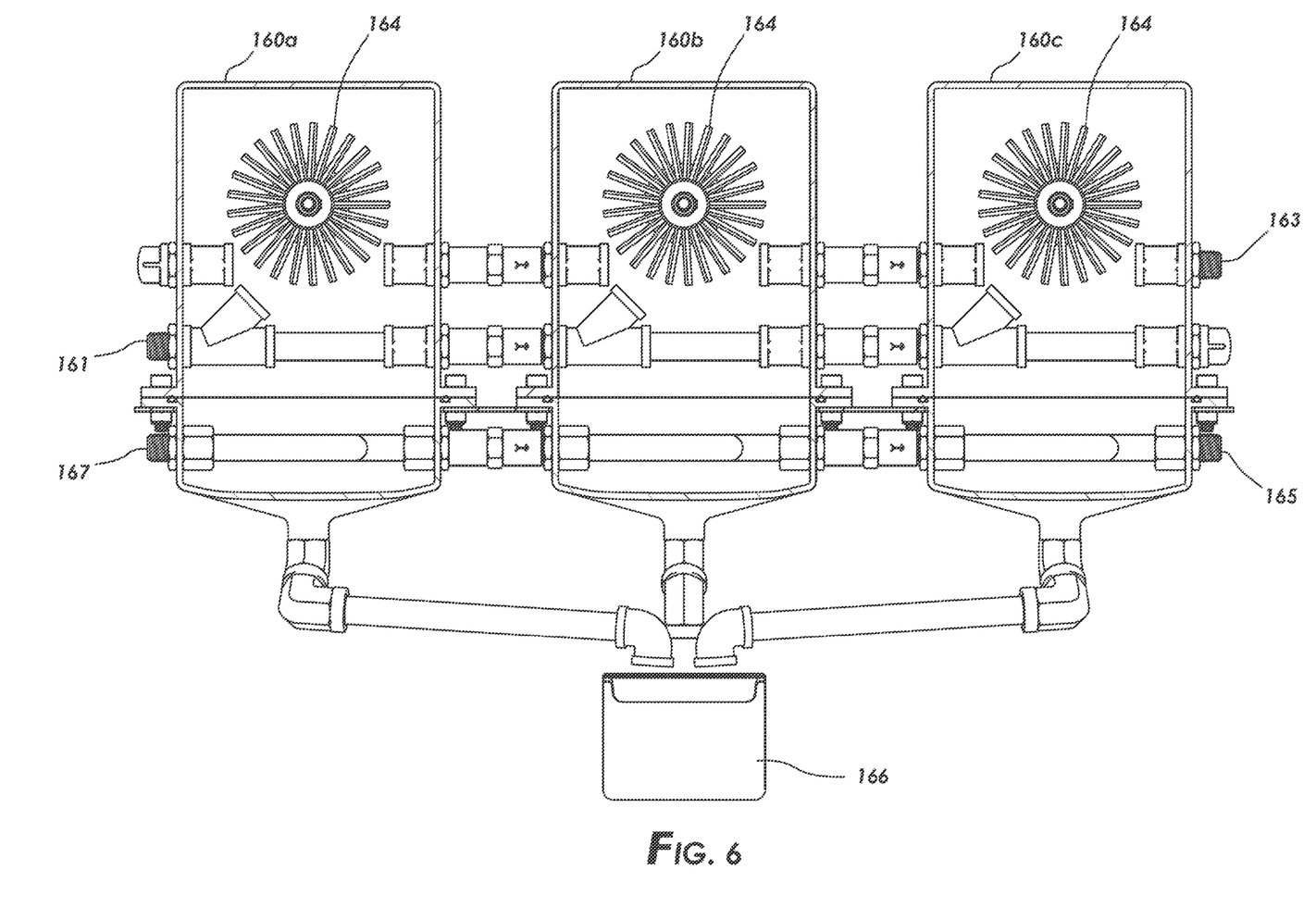
FIG. 6 is transparent front view of the steam turbine enclosures consistent with certain embodiments of the present disclosure.
Figure 7:
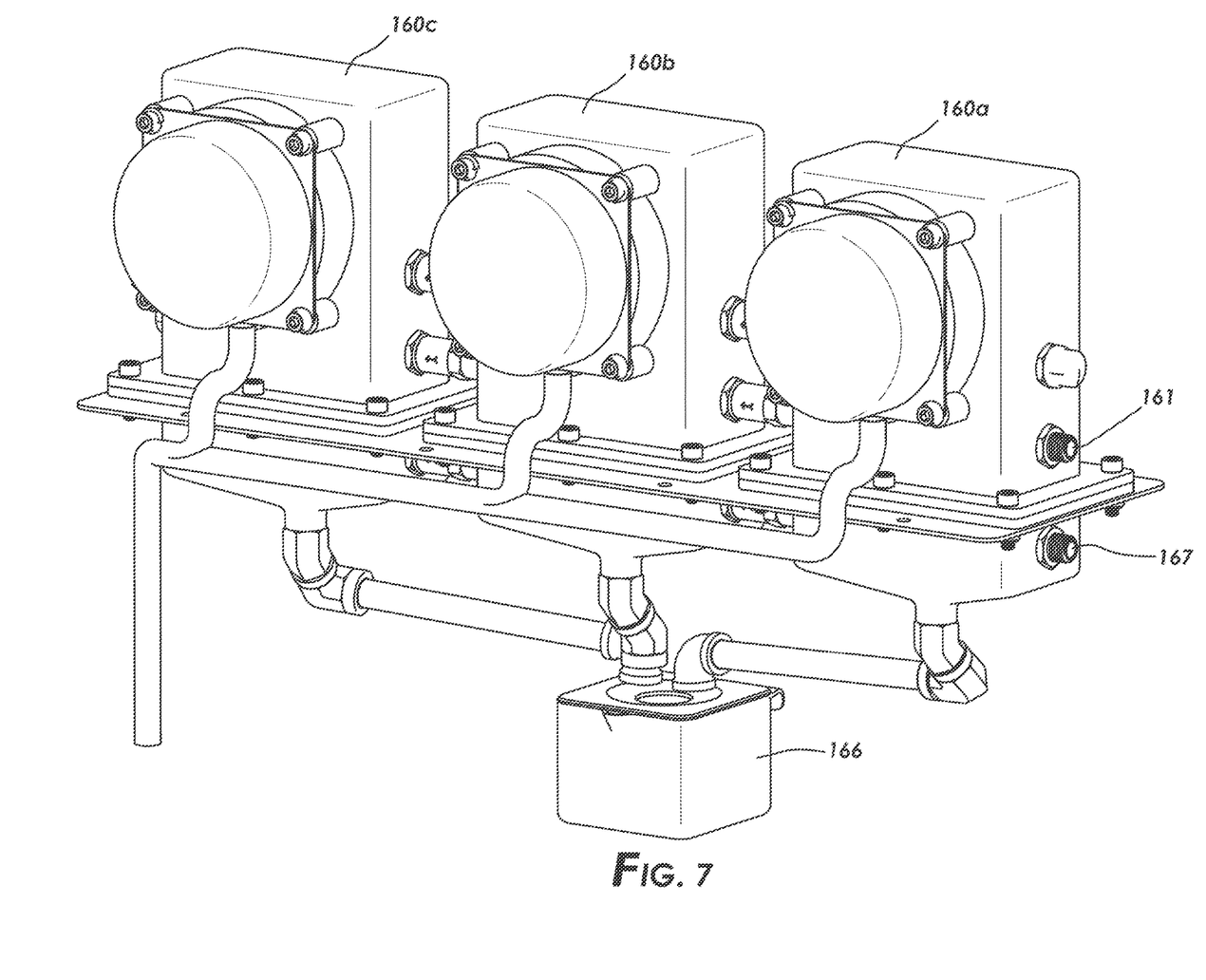
FIG. 7 is a side view of the steam turbine enclosures showing electrical generators which are connected to the turbines.

Steam enters first turbine enclosure 160a through distilled steam inlet 161. In certain embodiments, not all of the steam will condense in the first turbine enclosure 160a and fall into water collection tank 166, an example of which is shown in FIG. 5. Steam that has not condensed may flow into a second turbine enclosure 160*b*, where it again generates electricity while a portion of the steam condenses on another feed water heat exchanger 162 and falls into water collection tank 166. This continues until all or a major portion of the steam has been condensed back into water. If steam still exists after the last turbine enclosure, the steam may be redirected through steam outlet 163 to vapor removal device 210 where the steam may be used to remove low boiling point gases from the feed water. Also shown in FIG. 5 are feedwater inlet 165 and feedwater outlet 167. FIGS. 5 through 7 illustrate the design. In an alternative embodiment, excess steam that exits the last turbine enclosure is combined with the feed water prior to entering the feed water heat exchanger 162. The number of turbine enclosures included in the Figures are by way of example only and without limitation.

Figure 8:
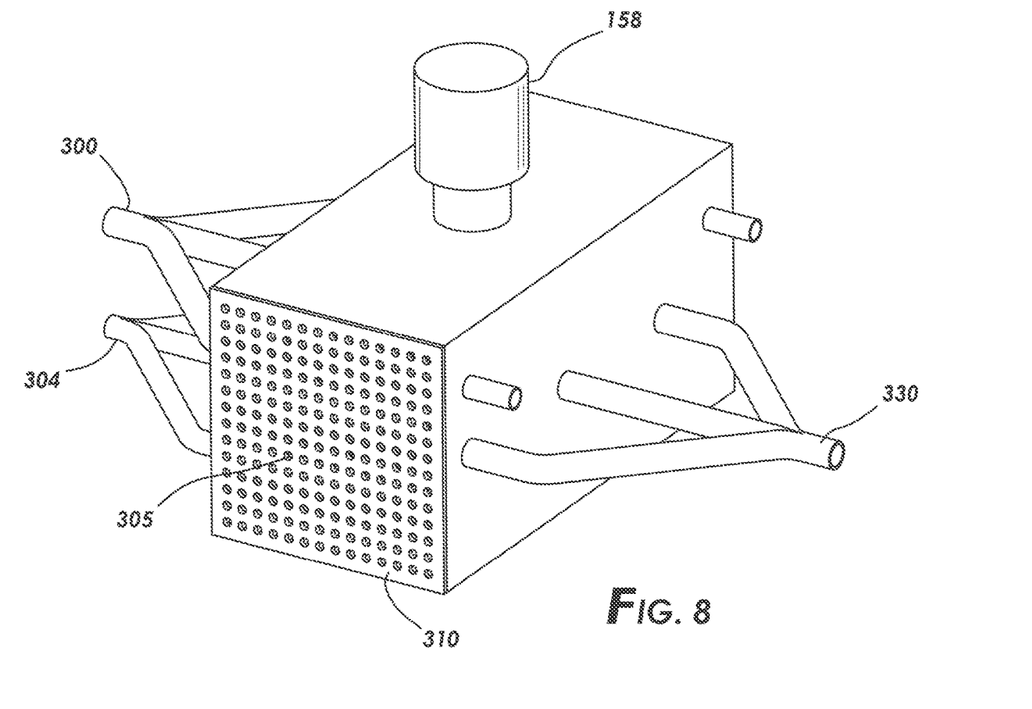
FIG. 8 is side view for the feed water heat exchanger/steam generator consistent with certain embodiments of the present disclosure.
Figure 9:
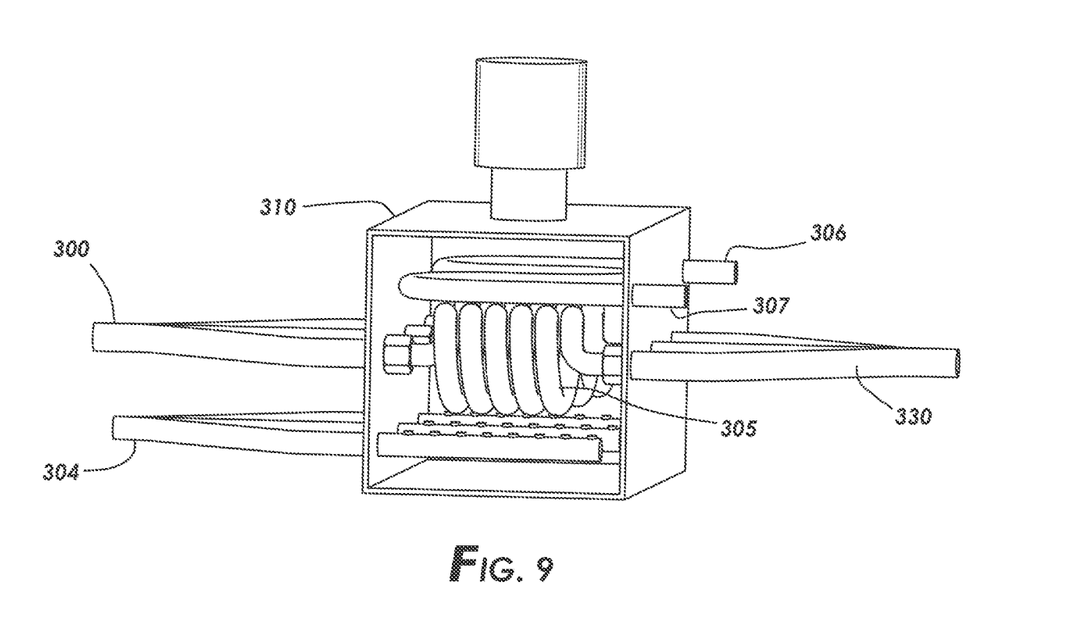
FIG. 9 is a cutaway/transparent side view of the feed water heat exchanger/steam generator consistent with certain embodiments of the present disclosure.

FIGS. 8 and 9 depict a feed arrangement for steam generator 310. In the embodiment shown in FIGS. 8 and 9, the deaerated feed water pipe configuration before entering the multiple set of coils 305 is designed to increase the production of distilled water and electricity. In this configuration, deaerated feed water pipe 300 separates into multiple pipes, causing the feed water to separate into multiple streams which flow through multiple sets of coils 305. Once the deaerated feed water passes through coils 305, the pipes converge back into one steam/brine/waste water outlet pipe 330. This configuration increases steam production compared to a single pipe, which in turn increases the steam force on turbine/generators 164, resulting in increased electrical generation. In addition, the increased steam flow causes a higher rate of condensation onto feed water heat exchangers 162 within the turbine enclosures 160*a, b, c*, increasing the rate of distilled water generation. A similar pipe configuration may be used prior to deaeration to increase feed water temperature. As further shown in FIGS. 8 and 9, gas inlet 304 feeds gas for burning. Feed water may be heated in steam generator 310. Feedwater inlet 306 and feedwater outlet 307 are shown.

Figure 10:
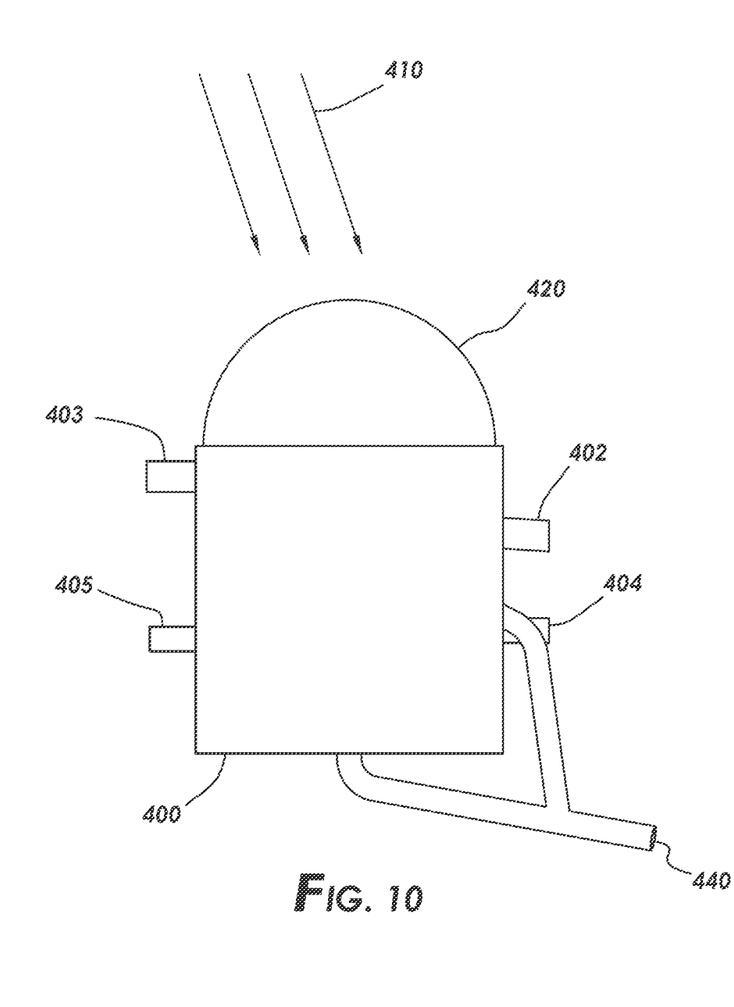
FIG. 10 is a side view of a solar brine/waste water tank consistent with certain embodiments of the present disclosure.

In certain embodiments of the present disclosure, solar brine/waste water tank 400 may be used, as shown in FIGS. 10 and 11 to heat feed water and/or brine/waste water. Feedwater inlet 402, feed water outlet 403, brine/waste water inlet 404 and brine/waste water outlet 405 are shown in FIGS. 10 and 11. Solar brine/waste water tank 400 is located with exposure to sunrays 410 and has transparent lid 420, which may be in the shape of either a hemisphere or geodesic dome. The shape of transparent lid 420 allows passive solar distillation to take place during daylight hours, accelerating the vaporization of water in the brine/waste water. In this embodiment, water vapor not only condenses into the distilled water basin 430, but also condenses on the inside of transparent lid 420 and moves down the sides of transparent lid 420 to distillation drain 440 at the bottom of solar brine/waste water tank 400. The solar energy increases the vaporization rate, causing more distilled water to be produced and collected. In addition, solar radiation raises the temperature of the feed water flowing through the heat exchanger within the brine tank, thereby reducing the total energy requirements of the system. In addition, a heater can be placed under the brine/waste water basin to accelerate the vaporization rate.

In certain embodiments of the present disclosure, it may be desirable to remove contaminants from water distillation process 10, such as by flushing. Flushing fluid may be retained in flushing solution tank 280. The type of flushing fluid may depend on the type of contaminants in the feed water, the pH of the feed water, as well as the type of material used in the system components. Sensors to determine the pH and other feed properties may aid in the selection of a flushing solution/process. As an example, a vinegar-based solution may be a low-cost, eco-friendly option. In some cases, the flushing procedure may involve the use of steam, the application of heat, variation of the flushing solution flow rate relative to normal system operation and/or the periodic use of flushing pulses. When applying heat, the burners are adjusted to a heat level that will contribute to dissolving and flushing the contaminants.

In certain embodiments, prior to starting the flushing sub-process, the following may be performed: stopping pumps 13, 130 and 240; closing valve 1 (120); opening valve 2; and closing valve 5. In addition, valve 6 may be opened and all burners may be turned off unless the flushing process requires heat. During the flushing sub-process, pumps 130 and 240 are turned on and set to a predetermined flushing flow rate. This allows the flushing solution to flow through feed water pump 130, the feed water pipe, heat exchangers, renewable preheater if there is one, deaerator coils, vapor removal device, pump 240, boiler coils, separation tank, valve 6, and the brine/waste water tank 174. If preheater 180 has been installed, the flushing process makes two passes through the system:

In pass 1, preheat valve 3 is opened and preheat bypass valve 4 is closed. This configuration flushes the preheater 180, as well as the rest of the system.

In pass 2, preheat valve 3 is closed and preheat bypass valve 4 is open. This configuration flushes the preheat bypass line as well as the rest of the system.

The flushing solution and contaminants will flow to the brine/waste water tank 174 where they can be removed for processing via tank truck, pipeline, or some other means.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A water system comprising:
   a system turbine enclosure, wherein the steam turbine enclosure includes a feed water heat exchanger above a first water collection tank;
   a feed water heat exchanger/steam generator in fluidic connection with the feed water heat exchanger, wherein the feed water heat exchanger/steam generator includes a feed water heat exchanger/steam generator heat exchanger, boiler coils, boiler burners and a boiler emissions control;
   a brine/waste water feed water heat exchanger positioned within a brine/waste water tank enclosure, the brine/waste water tank enclosure further including a brine/waste water tank, the brine/waste water feed water heat exchanger in fluidic connection with the feed water heat exchanger/steam generator;
   a preheater, the preheater in fluidic connection with the brine/waste water feed water heat exchanger;

a post-preheater heat exchanger enclosure including a post-preheater heat exchanger, post-preheater coils, a post-preheater burner and a post-preheater emissions control, the post-preheater heat exchanger in fluidic connection with the pre-heater; and a vapor removal device, the vapor removal device in fluidic connection with the post-preheater heat exchanger.

2. The water system in claim 1 further comprising a feed water pretreater, wherein the feed water pretreater is in fluidic connection with the feed water heat exchanger.

3. The water system of claim 1, wherein the steam turbine enclosure further includes a turbine/generator, wherein the turbine/generator is in fluidic connection with the feed water heat exchanger and positioned above the feed water heat exchanger.

4. The water system of claim 3, wherein the steam turbine enclosure and turbine/generator are adapted to generate electricity and distilled water.

5. The water system of claim 1, wherein the boiler burners are adapted to heat water in the feed water heat exchanger/steam generator heat exchanger.

6. The water system of claim 1, wherein the boiler coils are adapted to heat water in the feed water heat exchanger/steam generator heat exchanger.

7. The water system of claim 5 further comprising a fluidic connection between the boiler coils and the turbine/generator.

8. The water system of claim 1, wherein the brine/waste water tank is in fluidic connection to a brine/waste water processing tank.

9. The water system of claim 1, wherein the brine/waste water feed water heat exchanger is in fluidic connection to a second water collection tank.

10. The water system of claim 1, wherein the preheater is a solar preheater, a heat pump, an electrical heater or uses waste heat.

11. The water system of claim 1, wherein the vapor removal device is adapted to vent gases from feed water that have lower boiling points than feed water.

12. The water system of claim 11, wherein the post-preheater burners is computer controlled and adapted to be adjusted to achieve a predetermined temperature.

13. The water system of claim 1, wherein the post-preheater coils, or the boiler coils are ribbed.

14. The water system of claim 13, where the post-preheater coils, or the boiler coils comprise spray nozzles.

15. The water system of claim 1, wherein the vapor removal device is in fluidic connection with the steam turbine enclosure.

16. The water system of claim 1, wherein the boiler emissions control further includes a light source.

17. The water system of claim 1, wherein the boiler coils are in fluidic connection with a separation tank.

18. The water system of claim 17 further comprising a superheater positioned between the separation tank and a turbine enclosure.

19. The water system of claim 1, wherein the vapor removal device has a vapor removal emissions control device in fluidic connection with the feed water heat exchanger/steam generator.

20. The water system of claim 1, wherein the post-preheater coils comprise a plurality of post-preheater coils that are connected to a plurality of feed water pipes and/or the boiler coils comprise a plurality of boiler coils that are connected to a plurality of feed water pipes.

21. The water system of claim 1 further comprising a solar brine/waste water tank, wherein the solar brine/waste water tank includes a transparent lid.

22. The water system of claim 1, wherein the boiler burners are computer controlled and adapted to be adjusted to achieve a predetermined temperature.

23. A water system comprising:
a plurality of steam turbine enclosures, wherein each of the steam turbine enclosures includes a feed water heat exchanger, wherein at least one feed water heat exchanger is above a first water collection tank, wherein the plurality of steam turbine enclosures are in fluid connection with one another;

a feed water heat exchanger/steam generator in fluidic connection with the feed water heat exchangers, wherein the feed water heat exchanger/steam generator includes a feed water heat exchanger/steam generator heat exchanger, boiler coils, boiler burners and a boiler emissions control;

a brine/waste water feed water heat exchanger positioned within a brine/waste water tank enclosure, the brine/waste water tank enclosure further including a brine/waste water tank, the brine/waste water feed water heat exchanger in fluidic connection with the feed water heat exchanger/steam generator;

a preheater, the preheater in fluidic connection with the brine/waste water feed water heat exchanger;

a post-preheater heat exchanger enclosure including a post-preheater heat exchanger, post-preheater coils, a post-preheater burner and a post-preheater emissions control, the post-preheater heat exchanger in fluidic connection with the pre-heater; and a vapor removal device, the vapor removal device in fluidic connection with the post-preheater heat exchanger.

* * * * *

UNITED STATES PATENT AND TRADEMARK OFFICE
CERTIFICATE OF CORRECTION

| | |
|---|---|
| PATENT NO. | : 11,944,922 B1 |
| APPLICATION NO. | : 18/382804 |
| DATED | : April 2, 2024 |
| INVENTOR(S) | : Smith et al. |

It is certified that error appears in the above-identified patent and that said Letters Patent is hereby corrected as shown below:

In the Claims

Claim 1, Column 10, Line 51:
"a system turbine enclosure, wherein the steam turbine"
Should read:
"a steam turbine enclosure, wherein the steam turbine"

Claim 12, Column 11, Line 42:
"preheater burners is computer controlled and adapted to be"
Should read:
"preheater burner is computer controlled and adapted to be"

Signed and Sealed this
Seventh Day of May, 2024

Katherine Kelly Vidal
*Director of the United States Patent and Trademark Office*